May 25, 1937. W. C. HALL ET AL 2,081,881
CEMENT MIXER
Filed May 27, 1935 2 Sheets-Sheet 1
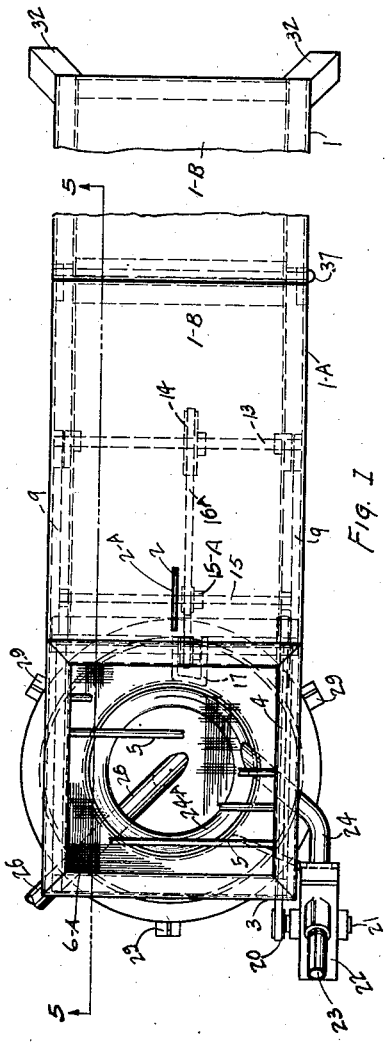
INVENTOR
Wilburn Clay Hall
BY Charley Proctor Hall
Victor J. Evans & Co. ATTORNEYS May 25, 1937.  W. C. HALL ET AL  2,081,881
CEMENT MIXER
Filed May 27, 1935  2 Sheets-Sheet 2

INVENTOR.
Wilburn Clay Hall
BY Charley Proctor Hall
Victor J. Evans & Co.  ATTORNEYS.

Patented May 25, 1937

2,081,881

UNITED STATES PATENT OFFICE 2,081,881

CEMENT MIXER

Wilburn Clay Hall and Charley Proctor Hall, Pearson, Okla.

Application May 27, 1935, Serial No. 23,777

1 Claim. (Cl. 83—73)

Our invention relates to improvements in cement mixers for use more particularly in connection with cementing the walls of oil wells and the like.

The primary object of our invention is to provide an improved apparatus for handling cement direct from sacks without necessitating manual opening of the latter, reducing lumps in the cement to finely powdered form and mixing the cement and water to the proper consistency.

Another object of our invention is to provide an apparatus for the purposes above specified which is equipped with improved means for distributing water under pressure throughout the cement and for mixing the latter with the former.

Another object is to provide efficient means for slitting sacks of cement, together with means operative to break up lump cement and driving mechanism for both said means, including a motor operated by water pressure whereby the apparatus may be connected to a source of water supply for operation of said means as an incident to operation of the above mentioned water distributing means.

Still another object is to provide an apparatus of the kind designated, parts of which may be quickly disassembled to render the apparatus readily portable.

Other objects together with the nature of my improvements will be readily understood when the following description and claims are read with reference to the drawings accompanying and forming part of this specification.

In the drawings:

Figure 1 is a view in top plan of apparatus constructed in accordance with our invention.

Figure 2 is a view in side elevation.

Figure 3:
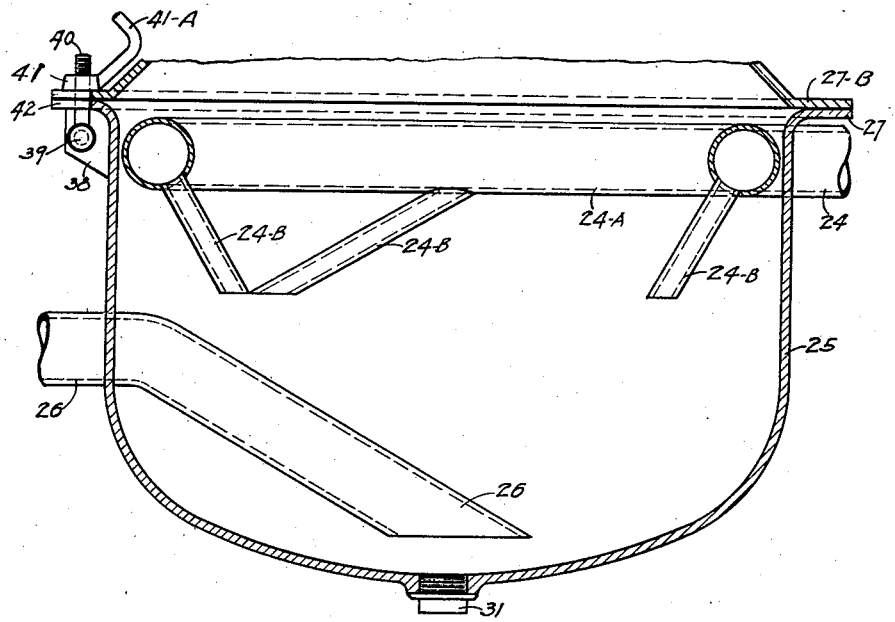
Figure 3 is a view in transverse vertical section of a cement mixing bowl and part of a cement supplying hopper with which our apparatus is equipped, together with parts of means for distributing water in said bowl.
Figure 4:
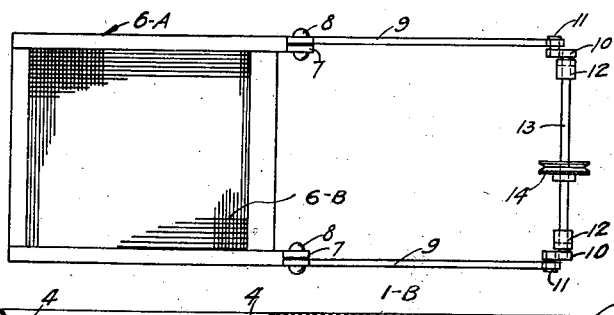
Figure 4 is a view in top plan of cement screening means of our invention together with parts of driving mechanism therefor.
Figure 5:
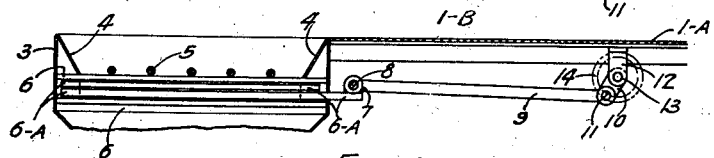
Figure 5 is a fragmentary view in longitudinal section taken on the line 5—5 of Figure 1 looking in the direction indicated by the arrows.

The illustrated embodiment of our invention includes, generally, a loading table 1 for supporting sacks of cement, a sack slitting means 2, a composite supply hopper 3 and mixing bowl 25, reciprocating cement screening frames 6—A co-operating with bars 5 to disintegrate or break up lumped cement, mixing means 24—A in the bowl 25 for distributing water throughout the cement therein and mixing the water and cement together, a water motor 22 in the line of connection between a source of supply of water under pressure and the distributing and mixing means, a suction discharge 26 for extracting the mixture from the bowl 25, and driving mechanism for operating the slitting means 2 and the cement screening frames 6 by said motor and presently described in detail.

The loading table 1 comprises front and rear sections 1—A, respectively, formed of top members 1—B and rectangular angle iron frames 1—C, the latter detachably connected together, end to end, by a removable rod 37 passing through suitably apertured mating lugs 35 and 36 on the frames, respectively. The front table section is suitably secured at its forward end to the hopper 3, level with the top thereof, and braced by inclined angle bars 33 extending from the rear end of said section to the lower end of said hopper. The rear table section is supported at its rear end by legs 32 detachably connected to the bars 33 by horizontal bars 33—A, also of angle iron, secured to said legs and bars by removable pins 34. Corner braces 33—B are fixed to the legs 32 and detachably secured to the bars 33—A in any suitable manner.

The sack slitting means 2 has the form of a rotatable circular knife fast upon a shaft 15 journaled on the underside of the front table section 1—A, transversely thereof, and adjacent the front end of said section, the knife projecting upwardly through said section by way of a slot 2—A in the latter. Said sack slitting means is rotated by means presently described. It may be stated at this point that the slitting means 2 is located close to the front end of the section 1—A, which is to say contiguous the hopper 3 for a purpose presently apparent.

The hopper 3 comprises an upper rectangular hopper portion formed by downwardly converging walls 4 therein, a lower hopper portion 4—A contiguous the upper portion, and a cylindrical discharge portion 4—B terminating in a lower outwardly flaring end portion 27—A.

The screening frames 6—A are secured together in superposed relation in any suitable manner to clamp therebetween a screen 6—B and are slidably mounted intermediate the hopper portions 4 and 4—A by the horizontal guide bars 6 on the inner walls of said hopper. The said screening frames are designed to be reciprocated longitudinally of the table 1, by means presently described and to cooperate with bars 5 suitably secured at their opposite ends within the hopper 3 transversely of said frames. The arrangement of the frame 6—A, screen 6—B, and bars 5 is such that said bars function to break up lumps of cement deposited on the screen 6—B during reciprocation of said frames.

The mixing bowl 25 is of inverted dome-like shape and provided with an upper edge flange 27 upon which the hopper 3 is supported, said hopper being provided with a similar flange 27—B. The flanges 27 and 27—B are secured together by bolts 40 pivoted as at 39 to ears 38 on said bowl to swing into slots 42 in said flanges, said bolts having threaded thereon nuts 41 provided with hand grips 41—A. Suitable legs 28 on the mixing bowl 25, provided with angle iron feet 29 secured to the legs as at 30 support the bowl 25 and hopper 3.

Within the mixing bowl 25, adjacent the upper edge thereof, is an annular water distributing pipe 24—A supported in said bowl in horizontal position by means of an inlet pipe 24 extending through the wall of said bowl and presently again referred to. The distributing pipe 24—A is provided with a plurality of downwardly and inwardly projecting discharge spouts or nozzles 24—B inclining tangentially to the axis of said pipe, the arrangement being such that water fed through said pipe under pressure is discharged through said spouts with a centrifugal action and inwardly of the mixing bowl 25. The inlet pipe 24 forms part of an intake line 23 connected to a suitable source of water pressure, such as the usual displacement pump (not shown).

Interposed in the line of connection 23 is a water motor 22 mounted by means of a bracket 22—A on the hopper 3 and including the motor shaft 21 having fast thereon a pulley 20. The pump 22 is connected in driving relation to the screening frames 6—A and the slitting means 2 as follows:

Suitably journaled on the underside of the front table section 1—A, transversely thereof, in brackets 12, is a shaft 13 provided on its opposite ends with crank arms 10 having wrist pins 11 thereon connected by links 9 and bolts 8 to lugs 7 on one of said frames 6—A. Fast upon the shaft 13 and the shaft 15 of the slitting means 2 are pulleys 14 and 15—A, respectively, connected by a belt 16—A to a pulley 16 fast upon a shaft 19 journaled on brackets 17 on the hopper 3, the shaft 19 having fast thereon a pulley 18 connected by a belt 20—A to the aforementioned pulley 20.

A suction discharge pipe 26 projects through the side of the bowl 25, said pipe inclining downwardly to a point adjacent the bottom and center of the bowl and having its extremity cut obliquely so that it is substantially parallel with the bottom of said bowl. The pipe 26 is connected to the usual suction pump, (not shown) and as will be understood, serves for evacuating the mixture from the bowl 25. The usual clean out plug 31 is threaded in the bottom of the bowl 25.

In the use and operation of our invention, the sacks of cement are shoved along the table over the slitting means 2, which cuts the sacks open, so that their contents may be poured into the hopper 3. The described screening means sifts the cement and in cooperation with the bars 5 breaks up any lumps in the latter. The distributing ring 24 and spouts 24—B impart a rotary action to the water, which in turn is imparted to the cement falling into the mixing bowl 25 from the screen 16, thereby thoroughly and speedily mixing the cement and water, the ring 24 acting as a header distributing water to the spouts 24—B under uniform pressure.

By having the extremity of the pipe 26 located and cut as described, the efficiency of the suction pump to which it is connected is appreciably increased.

It may be stated that the suction pipe 26 and the line 23 may have interposed therein valves (not shown) for regulating the supply of water through the line 23 and the degree of suction through the pipe 26.

By detaching the rear table section 1—A in a manner which will be clear and the hopper 3 from the mixing bowl 25, also disconnecting the line 23, the apparatus may be dismantled for convenient transportation from place to place.

The foregoing constitutes a detail description of a preferred embodiment of our invention. It is to be understood, however, that right is herein reserved to modifications of the precise details described falling within the scope of the appended claim.

What is claimed is:

In a cement mixing machine having a mixing chamber and means for slitting sacks of cement, the combination of means operative to break up and screen lump cement, driving mechanism for both said means, water distributing means for supplying water to said mixing chamber, means for conveying cement from the screens to said mixing chamber, and a pressure driven water motor actuating said driving mechanism located in series hydraulic circuit with the water distributing means, whereby the machine may be connected to a source of water under pressure for actuating said driving mechanism as an incident to operation of said water distributing means.

WILBURN CLAY HALL.
CHARLEY PROCTOR HALL.